3,474,094
Patented Oct. 21, 1969

3,474,094
3,5-DIALKYL-4-HYDROXY-THIOBENZAMIDES
Gordon G. Knapp, Southfield, Mich., assignor to Ethyl
Corporation, New York, N.Y., a corporation of Virginia
No Drawing. Original application Feb. 4, 1966, Ser. No.
525,133, now Patent No. 3,413,224, dated Nov. 26,
1968. Divided and this application Dec. 18, 1967, Ser.
No. 708,742
Int. Cl. C07d 87/46; C07c 153/05
U.S. Cl. 260—247.1                              10 Claims

ABSTRACT OF THE DISCLOSURE

Dialkyl hydroxy thiobenzamides are prepared by reacting sulfur with the corresponding dialkyl hydroxy benzyl amine or by reacting the corresponding dialkyl hydroxy benzaldehyde with sulfur and a secondary amine. Compounds prepared in this manner include 2,6-di-tert-butyl-4 - [morpholino(thiocarbonyl)]phenol and 3,5 - di - tert-butyl-4-hydroxy-N,N-dimethyl thiobenzamide. The compounds and the reaction solvent remaining after their removal are antioxidants.

---

This application is a division of copending application Ser. No. 525,133, filed Feb. 4, 1966, now U.S. 3,413,224, which in turn is a division of application Ser. No. 114,003, filed June 1, 1961, now U.S. 3,251,821.

This invention relates to a novel class of compounds, their preparation and their use as antioxidants. More particularly it relates to a novel and unusual class of 3,5-dialkyl-4-hydroxythiobenzamide compounds, methods for their preparation and the employment of these novel compounds as stabilizers and antioxidants for organic materials. This invention also relates to other novel and useful reaction products possessing extraordinary antioxidant properties.

It is an object of this invention to provide a novel class of chemical compounds. A further object is to provide methods for preparation of these compounds. Another object is to provide novel reaction products. Still another object is to provide novel compositions of matter comprising organic material stabilized against oxidative deterioration. A specific object of this invention is to provide lubricating oil stabilized against oxidative deterioration. Another specific object is to provide greases stabilized against oxidative deterioration. Still another object is to provide turbine and other industrial oils stabilized against oxidative deterioration. Other objects will become apparent from the following description of the invention.

The above and other objects are accomplished by provision of a compound having the formula I.
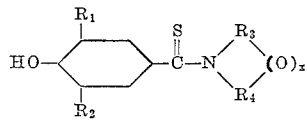

wherein $x$ is 0 or 1, $R_1$ and $R_2$ are each independent alkyl groups containing from 1 to 20 carbon atoms, $R_3$ and $R_4$ are each independently selected from the group consisting of alkyl, cycloalkyl, aralkyl, aryl and alkaryl when $x=0$ and the ethylene group when $x=1$.

In the above compounds it is preferable that the hydrocarbon radicals of the groups designated above as $R_3$ and $R_4$ contain the following ranges of carbon atoms: alkyl, 1 to 20; cycloalkyl, 5 to 6; aralkyl, 6 to 11; aryl, 6 to 10; and alkaryl, 7 to 15. These ranges are found to give antioxidants which are more readily prepared and more effective.

In referring to the alkyl substituents in $R_1$ and $R_2$, it is understood that these substituents may be aryl substituted, that is, may be aralkyl groups.

When $x$ in the above formula is 0 an embodiment of this invention is a thiobenzamide compound in which the hydrocarbon radicals of the groups designated above as $R_3$ and $R_4$ are alkyl groups having up to 20 carbon atoms.

When $x$ in the above formula is 1 an embodiment of this invention is a 2,6-dialkyl-4-[morpholino-(thiocarbonyl)]-phenol in which the alkyl groups may be alkyl or aralkyl and have up to 20 carbon atoms. Examples of the compounds of this invention include 3-n-decyl-4-hydroxy-5-(1,1-dimethyl-n-tetradecyl)-N-α-methylbenzyl-N-cyclohexylthiobenzamide;
3,5-diethyl-4-hydroxy-N-(1-methyl-n-butyl)-N-phenylthio-benzamide;
4-hydroxy-3-n-propyl-5-p-n-tridecylbenzyl-N-methyl-N-isopropylthiobenzamide;
3,5-di-tert-butyl-4-hydroxy-N,N-dimethylthiobenzamide;
3,5-di-n-octyl-4-hydroxy-N,N-dibenzylthiobenzamide;
2,6-di-tert-butyl-4-[morpholino-(thiocarbonyl)]-phenol;
2,6-di-(α,α-methylbenzyl)-4-[morpholino-(thio-carbonyl)]-phenol;
2,6-diethyl-4-[morpholino-(thiocarbonyl)]-phenol;
3,5-di-α,α-dimethylbenzyl)-4-hydroxy-N-naphthyl-N-p-methylphenylthiobenzamide;
3-benzyl-5-sec-butyl-4-hydroxy-N-n-butyl-N-(1-methyl-n-decyl)-thiobenzamide;
2,6-di-n-eicosyl-4-[morpholino-(thiocarbonyl)]-phenol;
3,5-di-n-eicosyl-4-hydroxy-N,N-di-n-propylthiobenzamide;
3,5-dimethyl-4-hydroxy-N,N-di-n-eicosylthio-benzamide; and
3,5-di-α-methylbenzyl-4-hydroxy-N,N-diethyl-thiobenzamide.

The compounds of this invention are water insoluble and non-polar. They range from white to yellow crystalline solids to viscous amber liquids. They are ashless and non-volatile facilitating their incorporation into a wide range of organic material.

A preferred embodiment of this invention consists of compounds of the above formula wherein $R_1$ is an alkyl group having from 1 to 12 carbon atoms and $R_2$ is an alpha-branched alkyl group having from 3 to 12 carbon atoms. These compounds are more effective antioxidants than other compounds within the scope of this invention. Among the compounds represented by this embodiment are 3,5-di-tert-butyl-4-hydroxy-N,N-di-n-octadecylthio-benzamide;
3-n-butyl-4-hydroxy-5-(1-methyl-n-pentyl)-N-(1,1-dimethyl-n-pentyl)-n-(1,1-dimethyl-n-tridecyl) thiobenzamide;
4-hydroxy-3,5-diisopropyl-N-n-hexyl-N-p-n-nonylphenyl-benzamide;
3,5-di-tert-butyl-4-hydroxy-N-n-butyl-N-phenylthio-benzamide;
2-tert-butyl-6-methyl-4-[morpholino-(thiocarbonyl)]-phenol;
4-hydroxy-3,5-di-n-pentyl-N,N-dicyclopentylthio-benzamide;
3-tert-butyl-4-hydroxy-5-methyl-N,N-dimethylthio-benzamide;
3,5-diisopropyl-4-hydroxy-N,N-di-n-tetradecylthio-benzamide; and
3-tert-butyl-4-hydroxy-5-methyl-N,N-di-n-dodecyl-thiobenzamide.

A particularly preferred embodiment of this invention is a compound of Formula X in which $R_1$ is an alkyl group of from 1 to 12 carbon atoms, $R_2$ is an alpha-branched alkyl group of from 3 to 12 carbon atoms, $x$ is 1 and $R_3$ and $R_4$ are ethylene groups. These compounds are particularly preferred because of their greater stability and greater antioxidant ability. Examples of the compounds of this embodiment include 2-methyl-6-tert-octyl-4-[morpholino-(thiocarbonyl)]-phenol;
2,6-di-tert-butyl-4-[morpholino-(thiocarbonyl)]-phenol;
2-n-butyl-6-(1-methyl-n-pentyl)-4-[morpholino-(thiocarbonyl)]-phenol;
2-tert-butyl-6-methyl-4-[morpholino-(thiocarbonyl)]-phenol; and
2,6-diisopropyl-4-[morpholino-(thiocarbonyl)]-phenol.

Another particularly preferred embodiment of this invention are compounds of Formula I wherein $R_1$ is an alkyl group of from 1 to 12 carbon atoms, $R_2$ is an alpha-branched alkyl group of from 3 to 12 carbon atoms, $x$ is 0 and $R_3$ and $R_4$ are alkyl groups of from 1 to 20 carbon atoms. These compounds are preferred because of their greater stability and because they are more effective antioxidants for oxygen-sensitive oils. Examples of the compounds of this embodiment include 3,5-diisopropyl-4-hydroxy-N,N-di-n-hexyldecylthiobenzamide; 3 - tert-butyl-5-(1-ethyl-n-decyl)-4-hydroxy - N,N - di-tert-butylthiobenzamide; 3-tert-butyl-4-hydroxy-5-methyl-N,N-di-n-tridecylthiobenzamide; 3-tert-butyl - 5-methyl-4-hydroxy-N,N-di-n-eicosylthiobenzamide; 3,5-di-tert-butyl-4-hydroxy-N,N-di-n-octylthiobenzamide; and 4-hydroxy-3-methyl-5-tert-octyl-N,N-di-n-nonylthiobenzamide.

The most particularly preferred embodiment of this invention are those compounds in which $R_1$ is an alkyl group of from 1 to 12 carbon atoms, $R_2$ is an alpha-branched alkyl group of from 3 to 12 carbon atoms, $x$ is 0, and $R_3$ and $R_4$ are methyl groups. These compounds are most particularly preferred because they have unequaled antioxidant activity in lubricating oils. Examples of the compounds of this embodiment include 3,5-di-tert-butyl-4-hydroxy - N,N - dimethylthiobenzamide; 3-tert-butyl-4-hydroxy-5-methyl- N,N - dimethylthiobenzamide and 3,5-diisopropyl-4-hydroxy-N,N - dimethylthiobenzamide.

The novel compounds of this invention can be prepared by two methods. In one embodiment of this invention the compounds are prepared by reacting a benzyl amine with sulfur. Thus, 3,5-di-tert-butyl-4-hydroxy-N,N-dimethylthiobenzamide is readily prepared by reacting 2,6-di-tert-butyl-α-dimethylamino - p-cresol with sulfur. Likewise, 2,6-di-tert-butyl-4 - [morpholino - (thiocarbonyl)]-phenol is prepared by the reaction of 2,6-di-tert-butyl-α-morpholine-p-cresol with sulfur.

The above reactions can be illustrated by the following general equation:

II.

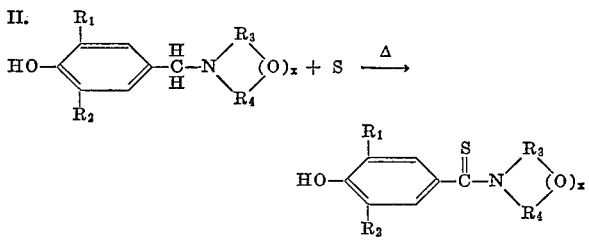

wherein $R_1$, $R_2$, $R_3$, and $R_4$ and $x$ are as in Formula I.

The preparation of 2,6-dialkyl-α-dihydrocarbonamino-p-cresols is described in U.S. Patent No. 2,962,531. They can be prepared by reacting a 2,6-dialkylphenol with a dihydrocarbonamine and formaldehyde. Thus, 2,6-di-tert-butyl-α-dimethylamino-p-cresol can be prepared by reacting 2,6-di-tert-butylphenol with dimethylamine and formaldehyde.

The 2,6-dialkyl-α-morpholino-p-cresols can be prepared by reacting a 2,6-dialkylphenol with morpholine and formaldehyde. Thus 2,6-di-tert-butyl - α-morpholino-p-cresol can be prepared by reacting 2,6-di-tert-butylphenol with morpholine and formaldehyde.

The temperatures employed in the reaction of Equation II vary from about 100° C. to the reflux temperature of the reaction mixture, but no higher than 300° C., at reaction times of from a few minutes to one week or more to give a good yield of product.

A preferred temperature range is from about 130° C. to about 220° C. At this temperature range the reaction proceeds smoothly, at a sufficiently rapid rate to give a good yield of product in a reasonable time with a minimum of undesirable side reactions.

In another embodiment of this invention the compounds are prepared by reacting a 3,5-dialkyl-4-hydroxybenzaldehyde, sulfur and an amine. Thus 3,5-di-tert-butyl-4-hydroxy-N,N-dimethylthiobenzamide is readily prepared by reacting 3,5-di-tert-butyl-4-hydroxybenzaldehyde with sulfur and dimethylamine. Likewise, 2,6-di-tert-butyl-4-[morpholino-(thiocarbonyl)]-phenol is prepared by the reaction of 3,5-di-tert-butyl-4-hydroxybenzaldehyde with sulfur morpholine. The above reaction can be illustrated by the following general equation:

III.

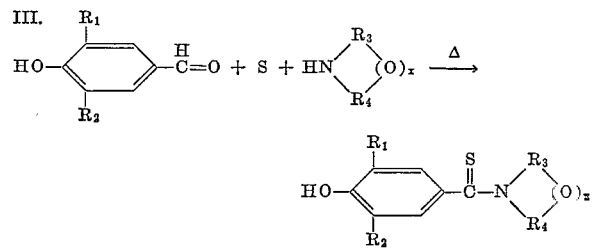

wherein $R_1$, $R_2$, $R_3$, $R_4$ and $x$ are as in Formula I.

The preparation of the 3,5-dialkyl-4-hydroxybenzaldehydes is described in application Ser. No. 77,276 entitled "Stabilized Plastic" filed Dec. 21, 1960, the inventors being Gordon G. Knapp and Calvin J. Worrel. They can be prepared by the bromination of the corresponding 2,6-dialkyl-p-cresol in the presence of alcohol with a subsequent hydrolysis of the brominated cresol. Thus 3,5-di-tert-butyl-4-hydroxybenzaldehyde can be prepared by brominating 2,6-di-tert-butyl-p-cresol and subsequently hydrolyzing the brominated cresol.

The temperatures employed in practicing this embodiment vary from about 50° C. to the reflux temperature of the highest boiling reaction mixture, about 300° C., at reaction times of from a few minutes to one week or more to give a good yield of product.

A preferred temperature range is from about 80° C. to about 135° C. In this temperature range the reaction proceeds rapidly giving a high yield of product with a minimum of undesirable side reactions.

In both the above reactions, in order to insure complete utilization of the starting phenolic compound, it is desirable to use an excess of sulfur. Furthermore, in order for the reaction to proceed more efficiently, elevated pressures may be employed.

Both reactions may be conducted with or without the aid of a solvent. For most of the compounds it is preferred not to use a solvent due to the lack of solubility of free sulfur. However, for certain compounds a solvent may be desired where the phenolic compound is a high melting solid and not liquid at the reaction. Further, when using lower boiling amines a solvent may be desired to facilitate the reaction. Such solvents are the higher boiling glycol ethers and alcohols such as ethylene glycol - mono - n - butyl ether, ethylene glycol monophenylether, ethylene glycol monobenzyl ether, n-hexyl alcohol, cyclohexanol, n-octyl alcohol, capryl alcohol, n-decyl alcohol, laurel alcohol, mesityl alcohol, cetyl alcohol, stearyl alcohol, benzyl alcohol, n-heptyl alcohol, n-nonyl alcohol, n-undecyl alcohol, and n-dodecyl alcohol. When lower tempeartures are desired other solvents may be used such as dioxane or pyridine.

In conducting the reaction of Equation III a convenient solvent is the amino reactant itself. When using such a solvent a convenient reaction temperature is the boiling point of the amine. Thus, when using morpholine as a solvent a temperature of from 125–130° C. is desirable. Further, when using lower boiling amines such as dimethyl amine the reaction is most conveniently conducted under pressure.

After the compounds have been formed they can be removed by any conventional means such as solvent extraction or filtration. The remaining mother liquor can then be condensed also by any conventional means such as distillation or evaporation, to yield a residual oil. These residual oils form another embodiment of this invention.

Thus another embodiment of this invention is the discovery that the residue remaining after removal of the compounds prepared by the reaction of Equations II and III and subsequent condensation of the mother liquor possess outstanding antioxidant properties. This residue is a red-brown viscous oily material. It is completely soluble in oil and other organic media. It is ashless and hydrolytically stable. Further, it possesses outstanding antioxidant properties.

Thus an embodiment of this invention is the residue remaining after removal of the compounds prepared by the reaction of Equation II and subsequent condensation of the mother liquor; that is, the reaction of a dibenzyl amine with sulfur. The term "dibenzyl amine" is intended to include the morpholino p-cresols of Equation II as well as the amino p-cresols.

Another embodiment of this invention is the residue remaining after removal of the compounds prepared by the reaction of Equation III and subsequent condensation of the mother liquor; that is the reaction of a benzaldehyde, sulfur and an amine or morpholine.

The molar ratio of sulfur to phenolic compounds in both the reactions of Equations II and III can be varied from about 1:1 to about 10:1 or more and still produce a good yield of oily residue. The yield of compounds of Formula I increases with the molar amount of sulfur used. Thus if it is desired to produce a low yield of compound and a higher yield of oily residue, a molar ratio of about 1:1 should be used. On the other hand, if a higher yield of compound is desired, higher molar ratios should be employed. Thus an embodiment of this invention is the preparation of highly effective antioxidant material by the reaction of Equations II or III wherein the molar ratio of sulfur to phenolic compound is from about 1:1 to about 10:1 or more.

In general, it has been found that increasing the molar ratio of sulfur to phenolic compound beyond that of about 5:1 affords only slightly increased yields of compounds in relation to the amount of sulfur used. Thus, a preferred embodiment of this invention is the preparation of a highly effective antioxidant material by the reaction of Equation II or III wherein the molar ratio of sulfur to phenolic compounds is from about 1:1 to about 5:1.

An excellent yield of compound is obtained with a minimum amount of unreacted phenolic compound when the molar ratio of sulfur to phenolic compounds is about 2:1. Thus a particularly preferred embodiment of this invention is the preparation of a highly effective antioxidant material by the reaction of Equations II or III wherein the molar ratio of sulfur to phenolic compound is about 2:1.

It is to be noted that this invention is not restricted to the use of a molar ratio of sulfur to phenolic compounds of about 1:1 or higher. On the contrary, although the yields of both compound and oily residue are lower when the ratio is below 1:1, both the compounds of Formula I and the residual oil are produced when such a ratio is lower.

The following examples illustrate the compounds of this invention and their preparation according to the method outlined in Equation II.

EXAMPLE 1

In a reaction vessel equipped with a stirrer, temperature measuring means and heating means were placed 40.0 parts by weight of 2,6 - di - tert - butyl - α - dimethylamino - p - cresol and 10.0 parts by weight of sulfur. The mixture was heated at 140–150° C. for one hour and then allowed to cool to room temperature. The resultant material was then triturated with n-hexane. A light yellow solid material precipitated which was filtered. This material was recrystallized from a 50 percent mixture of isooctane and ethanol, to give 39.0 parts by weight of yellow crystalline 3,5 - di - tert - butyl - 4 - hydroxy - N,N - dimethylthiobenzamide, melting point 163.5–164.5° C.

*Analysis.*—Calculated for $C_{17}H_{27}ONS$: 4.78 percent nitrogen, 10.93 percent sulfur. Found: 4.88 percent nitrogen, 11.0 percent sulfur.

Concentration of the n-hexane mother liquors from the n-hexane trituration yielded 19.1 parts by weight of a red-brown viscous oil. This residual oil is found to have excellent antoxidant properties.

EXAMPLE 2

In a pressure vessel equipped with venting means, heating means, a stirrer and temperature measuring means was placed 653 parts by weight of 2,6-di-tert-butyl-α-dimethylamino-p-cresol. The temperature was raised until the amino p-cresol was melted and 80.0 parts by weight of sublimed sulfur was added to the molten amino p-cresol. The pressure vessel was sealed, allowed to cool to approximately 70° C. and pressure tested with nitrogen. After the pressure test was completed the nitrogen was vented and the pressure vessel was heated to 140° C. The temperature was maintained between 140–148° C. for 3 hours. Heating was stopped and the mixture was allowed to cook for an additional 3 hours. During the heating period and the subsequent 3 hour cooking, pressure rose to 175 p.s.i. Upon completion of the 3 hour cooking period the pressure vessel was allowed to cool to 70° C. and was vented. The reaction mass was dissolved in a 50 percent mixture of toluene and n-hexane. Upon cooling, a crystalline product separated from the toluene-hexane mixture. This was filtered, washed with cold n-hexane and air dried to give 3,5-di-tert-butyl-4-hydroxy-N,N-dimethylthiobenzamide, melting point 162.0–162.5° C.

EXAMPLE 3

In a reaction vessel equipped with heating means, a stirrer and temperature measuring means was placed 74.0 parts by weight of 2-tert-butyl-6-methyl-α-dimethylamino-p-cresol and 22.0 parts by weight of sulfur. The mixture was added at 125–140° C. for 20 minutes, and at 135–145° C. for an additional 10 minutes. The reaction mixture was allowed to cool and was triturated with n-hexane. A solid separated which was filtered, dissolved in a 50 percent mixture of isooctano and ethanol and recrystallized to give a crystalline solid 3-tert-butyl-4-hydroxy-5-methyl-N,N-dimethylthiobenzamide, melting point 167–169° C.

*Analysis.*—Calculated for $C_{14}H_{21}OHS$: 12.73 percent sulfur, 5.57 percent nitrogen. Found: 12.9 percent sulfur, 5.53 percent nitrogen.

EXAMPLE 4

In a reaction vessel equipped with heating means, a stirrer, and temperature measuring means were placed 91.5 parts by weight of 2,6-di-tert-butyl-α-morpholino-p-cresol and 19.2 parts by weight of sulfur. The mixture was heated at 140–150° C. for one hour and at 160° C. for an additional 40 minutes. The reaction mixture was allowed to cool and was then dissolved in hot n-hexane. Upon cooling this mixture yielded solids which were filtered, dissolved in a 50 percent mixture of n-hexane and ethanol and recrystallized to give yellow crystalline 2,6- di-tert-butyl-4-[morpholino-(thiocarbonyl)]-phenol, melting point 177.5–179.5° C.

*Analysis.*—Calculated for $C_{19}H_{29}O_2NS$: 4.17 percent nitrogen. Found: 4.15 percent nitrogen.

EXAMPLE 5

In a reaction vessel equipped with a stirrer, temperature measuring means and heating means are placed 261 parts by weight of 2-tert-butyl-6-methyl-α-morpholino-p-cresol and 32 parts by weight of sulfur in 500 parts by weight of n-hexyl alcohol. The mixture is heated to 100° C. and kept at that temperature with stirring for one week. During this time a solid precipitates which is then filtered. This material is recrystallized from a 50 percent mixture of isooctane and ethanol to give 2-tert-butyl-6-methyl-4-[morpholino-(thiocarbonyl)]-phenol.

The n-hexyl alcohol mother liquid is concentrated to yield a residual oil which is found to have excellent antioxidane properties.

Good results are also obtained when other benzyl amines are treated in the manner of the above example. For example, the reaction of 2,6-diethyl-α-N-(1-methyl-n-butyl)-N-phenylamino-p-cresol with sulfur in ethylene glycol mono-n-butyl ether yields 3,5-diethyl-4-hydroxy-N-(1-methyl-n-butyl)-N-phenylthiobenzamide. Concentration of the solvent results in a residual oil which also has antioxidant properties. Likewise 2,6-di-(α,α-methylbenzyl)-α′-morpholino-p-cresol can be reacted with sulfur in n-decyl alcohol to produce 2,6-di-(α,α-methylbenzyl)-4-[morpholino-(thiocarbonyl)]-phenol.

EXAMPLE 6

In a reaction vessel equipped with heating means, a stirrer and temperature measuring means are placed 303 parts by weight of 2,6-di-tert-butyl-α-morpholino-p-cresol and 64 parts by weight of sulfur. The mixture is heated to 130° C. with stirring and maintained at that temperature for 8 hours. After cooling to room temperature the mixture is triturated with n-hexane. A precipitate is formed which is filtered and recrystallized from a 50 percent mixture of isooctane and ethanol to yield 2,6-di-tert-butyl-4-[morpholino-(thiocarbonyl)]-phenol. This compound is found to have excellent antioxidant properties.

Following the procedure in Example 6 good results are also obtained when 2-tert-butyl-6-(1-ethyl-n-decyl)-α-di-tert-butyl-amino-p-cresol is reacted with sulfur to produce 3-tert-butyl-5-(1-ethyl-n-decyl) - 4 - hydroxy-N,N-di-tert-butylthiobenzamide. A residual oil is obtained from this reaction which has excellent antioxidant properties. Likewise 2-n-butyl-6-(1-methyl-n-pentyl)-α-morpholino-p-cresol can be reacted with sulfur to form 2-n-butyl-6-(1-methyl - n - penyl) - 4 - [morpholino - (thiocarbonyl)]-phenol. The residuol oil from this reaction is likewise a good antioxidant.

EXAMPLE 7

In a pressure vessel equipped with venting means, heating means, a stirrer and temperature measuring means are placed 275 parts by weight of 2,6-diisopropyl-α-morpholino-p-cresol and 16 parts by weight of sulfur in 400 parts of capryl alcohol. The pressure vessel is sealed, heated to 160° C. and maintained at that temperature for 2 hours. After cooling to room temperature, the vessel is vented and the mixture filtered. A precipitate is obtained which is recrystallized from a 50 percent mixture of n-hexane and ethanol to yield 2,6-diisopropyl-4-[morpholino-(thiocarbonyl)]-phenol.

The n-capryl alcohol mother liquor is concentrated to yield a residual oil which possesses antioxidant properties.

The above procedure can be used to obtain good results when reacting 2,6-diethyl-α-morpholino-p-cresol with sulfur. The residual ether produced as a result of this reaction is found to have antioxidant properties as well as the compound itself. Likewise, 2-tert-butyl-6-methyl-α-di-n-eicosylamino-p-cresol can be reacted with sulfur to produce 3-tert-butyl-5-methyl - 4 - hydroxy-N,N-di-n-eicosylthiobenzamide. The residual oil resulting from this reaction is also found to possess good antioxidant properties.

EXAMPLE 8

To a reaction vessel equipped with heating means, a stirrer and temperature measuring means are added 351 parts by weight of 2,6-di-tert-butyl-α-N-n-butyl-N-phenyl-p-cresol and 160 parts by weight of sulfur. The mixture is heated to 220° C. and kept at that temperature with stirring for ½ hour. The mixture is then cooled to room temperature and triturated with n-hexane. A precipitate is formed which is filtered and recrystallized from a 50 percent mixture of n-hexane and ethanol to yield 3,5-di-tert-butyl-4-hydroxy-N-n-butyl-N-phenylthiobenzamide.

The n-hexane mother liquor from the trituration is concentrated to produce a residual oil which has outstanding antioxidant properties.

Good results are also obtained when 2-tert-butyl-6-methyl-α-dimethylamino-p-cresol is reacted with sulfur in the above manner. The residual oil resulting from this reaction is found to possess good antioxidant properties. Likewise, 2,6-di-(α-methylbenzyl)-α′ - diethylamino - p-cresol can be reacted with sulfur to produce 3,5-di-(α-methylbenzyl)-4-hydroxy-N,N - diethylthiobenzamido. A residual oil results from this reaction which is found to be an excellent antioxidant.

EXAMPLE 9

In a pressure vessel equipped with venting means, heating means, a stirrer and temperature measuring means are added 662 parts by weight of 2-n-decyl-6-(1,1-dimethyl-n-tetradecyl)-α-N-(α′-methylbenzyl)-N-cyclohexylamino-p-cresol and 256 parts by weight of sulfur. The pressure vessel is sealed, and heated to a temperature of 300° C. for 5 minutes. It is then allowed to cool to room temperature and vented. Upon trituration with n-hexane a solid precipitates from the mixture. This solid is filtered and recrystallized from a 50 percent mixture of n-hexane and ethanol to yield 3-n-decyl-4-hydroxyl-5-(1,1-dimethyl-n-tetradecyl)-N-α-methylbenzyl - N - cyclohexylthiobenzamide.

The n-hexane mother liquor from the trituration is concentrated to yield a residual oil which has outstanding antioxidant properties.

Good results are also obtained when other benzyl-amines are reacted in the above manner. Thus, 2,6-di-n-octyl-α-dibenzylamino-p-cresol can be reacted with sulfur to produce 3,5-di-n-octyl-4-hydroxy - N,N - dibenzylthiobenzamide. The residual oil resulting from this reaction is found to be a good antioxidant. Likewise, 2,6-di-tert-butyl-α-dimethylamino-p-cresol can be reacted with sulfur to produce 3,5-di-tert-butyl-4-hydroxyl-N,N-dimethylthiobenzamide. The residual oil produced from this reaction is also found to be a good antioxidant.

EXAMPLE 10

In a reaction vessel equipped with heating means, a stirrer, temperature measuring means and a reflux condenser are placed 477 parts by weight of 2-n-propyl-6-p-n-tridecylbenzyl-α-N-methyl-N-ispropylamino-p - cresol and 320 parts by weight of sulfur. The reaction mixture is refluxed for 2 days, cooled to room temperature and triturated with n-hexane. A solid precipitates which is filtered and recrystallized from a 50 percent mixture of isooctane and ethanol to yield 4-hydroxy-3-n-propyl-5-p-n-tridecyl-benzyl-N-methyl-N-isopropylthiobenzamide.

The n-hexane mother liquor from the trituration is concentrated to yield a residual oil with excellent antioxidant properties.

Good results are also obtained when 2-tert-butyl-6-methyl-α-di-n-dodecylamino-n-cresol is reacted with sulfur in the above manner to produce 3-tert-butyl-4-hydroxy-5-methyl-N,N-di-n-dodecylthiobenzamide. A residual oil results from this reaction which is found to have good antioxidant properties.

The following examples illustrate the compounds of this invention and their preparation according to the method outlined in Equation III.

EXAMPLE 11

In a reaction vessel equipped with heating means, a stirrer and temperature measuring means were placed 10.0 parts by weight of 3,5-di-tert-butyl-4-hydroxybenzaldehyde, 3.4 parts by weight of sulfur and 10.0 parts by weight of morpholine. The mixture was refluxed for 3 hours. The reaction mixture was then allowed to cool, dissolved in chloroform, washed in sequence with water, dilute sodium bicarbonate, dilute hydrochloride acid and finally water, dried and evaporated at room temperature to yield white crystalline 2,6-di-tert-butyl-4-[morpholino-(thiocarbonyl)]-phenol which, upon recrystallization from a 50 percent mixture of n-hexane and ethanol, had a melting point of 180–181° C. The mixed melting point of this material with the crystalline product obtained in Example 4 was 179–180° C., establishing the two materials as identical.

EXAMPLE 12

In a reaction vessel equipped with heating means, a stirrer and temperature measuring means are placed 343 parts by weight of 3,5-di-(α,α-dimethylbenzyl)-4-hydroxybenzaldehyde, 209 parts by weight of N-naphthyl-N-p-methylphenylamine and 32 parts by weight of sulfur in 1000 parts of by weight of dioxane. The mixture is heated to 50° C. and maintained at that temperature for one week. The solvent is removed under reduced pressure and the resulting residue is taken up in a 50 percent mixture of hot ethanol and isooctane, filtered and cooled to yield 3,5-di-(α,α-dimethylbenzyl)-4-hydroxy-N-naphthyl-N - p-methylphenylthiobenzamide.

The dioxane mother liquor is concentrated to yield a residual oil which is found to be an excellent antioxidant.

Good results are also obtained when other benzaldehydes are reacted with other amines and sulfur in a similar manner. Thus 3,5-diisopropyl-4-hydroxybenzaldehyde can be reacted with N,N-dimethylamine and sulfur in lauryl alcohol to produce 3,5-diisopropyl-4-hydroxy-N,N - dimethylthiobenzamide. The residual oil resulting from this reaction is found to have good antioxidant properties. Likewise 3,5-diisopropyl-4-hydroxybenzaldehyde can be reacted with N-n-hexyl-N-p-n-nonylphenylamine and sulfur in benzyl alcohol to product 4-hydroxy-3,5-diisopropyl-N-n-hexyl-N-p-n-nonylphenylbenzamide. The residual oil produced by this reaction is also found to have excellent antioxidant properties. Also 3,5-di-tert-butyl-4-hydroxybenzaldehyde can be reacted with N,N-dimethylamine and sulfur in octyl alcohol to produce 3,5-di-tert-butyl-4-hydroxyl-N,N-dimethylthiobenzamide. A residual oil is also produced from this reaction which has outstanding antioxidant properties.

EXAMPLE 13

In a reaction vessel equipped with heating means, a stirrer and temperature measuring means are placed 241 parts by weight of 3,5-di-n-eicosyl-4-hydroxybenzaldehyde, 101 parts by weight of N,N-di-n-propylamine and 64 parts by weight of sulfur in 500 parts by weight of pyridine. The mixture is heated to 80° C. and maintained at that temperature for 3 hours. After cooling to room temperature the mixture is triturated with n-hexane. A solid is precipitated which is filtered and recrystallized from a 50 percent mixture of n-hexane and ethanol to yield 3,5-di-n-eicosyl-4-hydroxy-N,N - di - n-propylthiobenzamide.

The pyridine mother liquor is concentrated to yield a residual oil which has excellent antioxidant properties.

Further, good results are obtained when 3,5-di-tert-butyl-4-hydroxybenzaldehyde is reacted with N,N-di-n-octylamine and sulfur in stearyl alcohol. This reaction also produces a residual oil which has excellent antioxidant properties. Likewise, 3-n-butyl-4-hydroxy-5-(1-methyl-n-pentyl)-benzaldehyde can be reacted with N-(1,1-dimethyl-n-pentyl)-N-(1,1-dimethyl-n-tridecyl)-amine and sulfur in ethylene glycol monobenzylether to yield 3-n-butyl-4-hydroxy-5-(1-methyl-n-pentyl)-N-(1,1 - dimethyl-n-pentyl)-N-(1,1-dimethyl-n - tridecyl) - thiobenzamide. This reaction also yields a residual oil which has excellent antioxidant properties.

EXAMPLE 14

In a pressure vessel equipped with venting means, heating means, a stirrer and temperature measuring means are placed 482 parts by weight of 3,5-di-n-eicosyl-4-hydroxybenzaldehyde, 174 parts by weight of morpholine and 32 parts by weight of sulfur in 1000 parts by weight of mesityl alcohol. The pressure vessel is sealed, heated to 100° C. and kept at that temperature for one hour. It is then cooled to room temperature and vented. A precipitate is formed which is filtered and recrystallized from a 50 percent mixture of isooctane and ethanol to yield 2,6-eicosyl-4-[morpholine-(thiocarbonyl)]-phenol.

The mesityl alcohol mother liquor is concentrated to produce a residue which has excellent antioxidant properties.

The above procedure can be used to produce other excellent antioxidant compounds and antioxidant residual oils. Thus, 3-benzyl-5-sec-butyl-4-hydroxybenzaldehyde can be reacted with N-n-butyl-N- 1-methyl-n-decyl)-amine and sulfur in n-nonyl alcohol to produce 3-benzyl-5-sec-butyl-4-hydroxy-N-n-butyl-N-(1 - methyl-n-decyl)-thiobenzamide. The residual oil produced from this reaction is an excellent antioxidant. Likewise, 3,5-tert-butyl-4-hydroxybenzaldehyde can be reacted with di-n-octyldecylamine and sulfur in ethylene glycol monophenyl ether to produce 3,5-tert-butyl-4-hydroxy-N,N-di-n-octyldecylthiobenzamide. The residual oil resulting from this reaction is also a good antioxidant.

EXAMPLE 15

In a reaction vessel equipped with a stirrer, heating means and temperature measuring means are placed 191 parts by weight of 3-tert-butyl-4-hydroxy-5-methylbenzaldehyde, 600 parts by weight of di-n-tridecylamine and 160 parts by weight of sulfur. The reaction mixture is heated to 135° C. and kept at that temperature for ½ hour. During this time a solid precipitate which is filtered and recrystallized from a 50 percent mixture of n-hexane and ethanol to yield 3-tert-butyl-4-hydroxy-5-methyl-N, N-di-n-tridecylthiobenzamide.

The amine mother liquor from the above reaction can be concentrated to yield a residual oil which has outstanding antioxidant properties.

Further, good results are also obtained in following the above procedure when reacting 3-methyl-5-tert-octyl-4-hydroxybenzaldehyde with sulfur in a molar excess of morpholine to produce 2-methyl-6-tert-octyl-4-[morpholino-(thiocarbonyl)]-phenol. This reaction also produces a residual oil which has good antioxidant properties.

EXAMPLE 16

In a pressure vessel equipped with venting means, heating means, a stirrer and temperature measuring means are placed 261 parts by weight of 4-hydroxy-3,5-di-n-pentylbenzaldehyde, 153 parts by weight of dicyclopentylamine and 256 parts by weight of sulfur. The pressure vessel is sealed and heated to 300° C. for 5 minutes after which it is allowed to cool and then vented. The mixture is then triturated with n-hexane. A solid precipitates which is filtered and recrystallized from a 50 percent mixture of n-hexane and ethanol to yield 4-hydroxy-3,5-di-n-pentyl-N,N-dicyclopentylthiobenzamide.

The n-hexane mother liquor from the trituration is condensed to yield a residual oil which is found to have good antioxidant properties. Good results are also obtained when the above procedure is followed in reacting 3,5 - diisopropyl-4-hydroxybenzaldehyde with di-n-tetradecylamine and sulfur to yield 3,5-diisopropyl-4-hydroxy-N,N-di-n-tetradecylthiobenzamide. A residual oil results from this reaction which has good antioxidant properties.

EXAMPLE 17

In a reaction vessel equipped with heating means, a stirrer, temperature measuring means and a reflux condenser are placed 261 parts by weight of 3,5-diisopropyl-4-hydroxybenzaldehyde, 113 parts by weight of di-n-hexadecylamine and 320 parts by weight of sulfur. The mixture is refluxed for 3 days. It is then cooled and triturated with n-hexane. A solid precipitates which is filtered and recrystallized from a 50 percent mixture of isooctane and ethanol to yield 3,5-diisopropyl-4-hydroxy-N,N-di-n-hexadecylthiobenzamide.

The n-hexane mother liquor from the trituration can be condensed to yield a residual oil which has excellent antioxidant properties.

Good results are also obtained when other benzaldehydes are reacted with other amines and sulfur. Thus, 4-hydroxy-3-methyl-5-tert-octylbenzaldehyde can be reacted with di-n-nonylamine and sulfur to produce 4-hydroxy - 3 - methyl-5-tert-octyl-N,N-di-n-nonylthiobenzamide. This reaction also yields a residual oil which has excellent antioxidant properties.

The products of this invention are outstanding antioxidants. Therefore, an embodiment of this invention is a new composition of matter which comprises organic material normally tending to undergo oxidative deterioration in the presence of air, oxygen or ozone containing an appropriate quantity—from 0.001 up to about 5 percent, and preferably from about 0.10 to about 2 percent—of a product of this invention. The methods of using the products of this invention as antioxidants are fully described in U.S. 3,251,821, issued May 17, 1966, the disclosure of which is incorporated herein by reference. The term "product" is meant to include the compounds of Formula I and also the residual oil produced by the reactions of Equations II or III.

While $R_3$ and $R_4$ of Formula I have been described without substituents attached thereto it is to be understood that this invention is not restricted to those compounds which are only unsubstituted in those positions but extends also to those compounds where $R_3$ and $R_4$ have substituents such as alkyl, aryl, cycloalkyl, aralkyl, halogen and nitro groups.

I claim:
1. A compound having the formula:

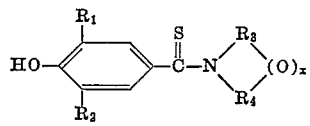

wherein $x$ is selected from 0 and 1, $R_1$ and $R_2$ are each individually selected from the group consisting of alkyl radicals of from 1–20 carbon atoms and aralkyl radicals of from 7–20 carbon atoms, $R_3$ and $R_4$ are, when $x$ equals 0, each independently selected from the group consisting of alkyl radicals of from 1–20 carbon atoms, cycloalkyl radicals of from 5–6 carbon atoms, aralkyl radicals of from 7–11 carbon atoms, phenyl radicals of from 6–10 carbon atoms, and alkaryl radicals of from 7–15 carbon atoms, and when $x$ equals 1, are ethylene radicals.

2. The compound of claim 1 wherein $x$ is 1, $R_1$ is an alkyl radical of from 1–12 carbon atoms, and $R_2$ is an alpha-branched alkyl radical of from 3–12 carbon atoms.

3. The compound of claim 1 wherein $x$ is 1 and $R_1$ and $R_2$ are tert-butyl radicals, namely 2,6-di-tert-butyl-4-(morpholino(thiocarbonyl))phenol.

4. The compound of claim 1 wherein $x$ is 0, $R_3$ is the methyl radical, and $R_1$, $R_2$ and $R_4$ are alkyl radicals of from 1–20 carbon atoms.

5. The compound of claim 1 wherein $x$ is 0, $R_1$ is an alkyl radical of from 1–12 carbon atoms, $R_2$ is an alpha-branched alkyl radical of from 3–12 carbon atoms, and $R_3$ and $R_4$ are alkyl radicals of from 1–20 carbon atoms.

6. The compound of claim 1 wherein $x$ is 0, $R_1$ and $R_2$ are tert-butyl radicals and $R_3$ and $R_4$ are n-octyl radicals, namely, 3,5 - di-tert-butyl-4-hydroxy-N,N-di-n-octylthiobenzamide.

7. The compound of claim 1 wherein $x$ is 0, $R_1$ and $R_2$ are tert-butyl radicals and $R_3$ and $R_4$ are n-octadecyl radicals, namely, 3,5 - di - tert-butyl-4-hydroxy-N,N-di-n-octadecylthiobenzamide.

8. The compound of claim 5 wherein $R_3$ and $R_4$ are methyl radicals.

9. The compound of claim 1 wherein $x$ is 0, $R_3$ and $R_4$ are methyl radicals and $R_1$ and $R_2$ are tert-butyl radicals, namely, 3,5 - di - tert-butyl-4-hydroxy-N,N-dimethylthiobenzamide.

10. The compound of claim 1 wherein $x$ is 0, $R_3$ and $R_4$ are methyl radicals, $R_1$ is the methyl radical and $R_2$ is the tert-butyl radical, namely, 3-methyl-5-tert-butyl-4-hydroxy-N,N-dimethylthiobenzamide.

References Cited

UNITED STATES PATENTS 3,158,537   11/1964   Goodhue et al. _____ 260—551

NICHOLAS S. RIZZO, Primary Examiner

JOSE TOVAR, Assistant Examiner

U.S. Cl. X.R.
252—47.5; 260—551

PO-1050
(5/69)

UNITED STATES PATENT OFFICE
CERTIFICATE OF CORRECTION

Patent No. 3,474,094　　　　　　　　　Dated October 21, 1969

Inventor(s) Gordon G. Knapp

It is certified that error appears in the above-identified patent and that said Letters Patent are hereby corrected as shown below:

Column 2, line 69, "Formula X" should read -- Formula I --

SIGNED AND
SEALED
FEB 17 1970

(SEAL)
Attest:

Edward M. Fletcher, Jr.
Attesting Officer

WILLIAM E. SCHUYLER, JR.
Commissioner of Patents